United States Patent [19]

Bajka

[11] 4,322,297

[45] Mar. 30, 1982

[54] CONTROLLER AND CONTROL METHOD FOR A POOL SYSTEM

[76] Inventor: Peter Bajka, 725 Casita Way, Los Altos, Calif. 94022

[21] Appl. No.: 178,931

[22] Filed: Aug. 18, 1980

[51] Int. Cl.³ .......................... B01D 35/02; C02B 1/02
[52] U.S. Cl. .................................... 210/742; 210/102; 210/103; 210/138; 210/169; 210/181
[58] Field of Search ........ 210/742, 102, 103, 138–143, 210/180, 181, 169

[56] References Cited

U.S. PATENT DOCUMENTS

| | | | |
|---|---|---|---|
| 3,012,156 | 12/1961 | Simmons | 210/142 X |
| 3,394,813 | 7/1968 | Phillips et al. | 210/149 |
| 3,809,116 | 5/1974 | Sanner | 137/391 |
| 3,906,928 | 9/1975 | Wright | 126/271 |
| 3,991,742 | 11/1976 | Gerber | 126/271 |
| 4,115,877 | 9/1978 | Wall | 210/169 |
| 4,187,175 | 2/1980 | Roberts et al. | 210/149 X |
| 4,224,154 | 9/1980 | Steininger | 210/142 X |

Primary Examiner—John Adee
Attorney, Agent, or Firm—Manfred M. Warren; Robert B. Chickering; Glen R. Grunewald

[57] ABSTRACT

A controller and method for controlling the operation of electrically powered pool related apparatus in recreational pool system, and more particularly for controlling the flow of pool water through the pool system and water-conditioning apparatus, is disclosed. The controller includes a logic circuit formed with a plurality of logic gates coupled to pool-water-sensing apparatus and programmable input apparatus in accordance with a predetermined logic sequence. The pool system includes a swimming pool and spa, and the pool-water-conditioning apparatus includes a solar water heater and a non-solar water heater. The controller is capable of preferential solar heating and of temperature-switched operation, time-switched operation and a combination thereof, as well as manual switching.

29 Claims, 6 Drawing Figures

CONTROLLER AND CONTROL METHOD FOR A POOL SYSTEM

BACKGROUND OF THE INVENTION

The recreational pool industry has experienced two dramatic trends that have affected the industry in a pervasive manner. First, the energy crisis has hastened the development of solar energy water-heating apparatus, and today there are numerous solar-energy-based systems which are quite practical and in widespread use in connection with heating pool water. The second recent phenomenon is the widespread popularity of spas or hot tubes, which are installed and used alone or in conjunction with swimming pools.

The energy crisis and the increased interest in and the popularity of spas inherently pose some degree of conflict. Spas normally operate at water temperatures in excess of 90° F. and typically include water jets or the like for circulation of the water and for hydromassage. Both increased water temperature and water circulation require the use of energy. By contrast, however, a spa is a much smaller body of water than a swimming pool, making the total heat required less and the ability to conserve heat by covering the smaller pool of water is more practical.

One area in which efforts to conserve energy have been largely overlooked has been in connection with control apparatus for controlling the operating conditions of the water in a pool system. U.S. Pat. No. 3,991,742 discloses a swimming pool system which employs both a gas heater and a solar heater. The swimming pool filter pump is used to pump water to either the solar heater or the gas heater and subsequently to return the water to the pool. The thrust of U.S. Pat. No. 3,991,742 is directed to the construction of the solar heating apparatus or panels, not a system or apparatus for controlling the flow of pool water as between the solar panels and the gas heater.

In the system of U.S. Pat. No. 3,991,742, the flow of water is controlled by gate valves that are manually operated. In practice most pool water heating systems that include solar and gas heating are either manually controlled or provided with a simple timer that controls a plurality of valves. Thus, the filter pump can be switched off and on by the timer, and the gate valves can be operated by solenoids and coupled to the timer. Such "controlling" of the heaters and other water-conditioning apparatus in recreational pool systems, therefore, has been relatively crude and largely based upon user convenience rather than any attempt at providing energy efficiency.

The control timers which have previously been used with recreational pool systems have also generally been "dumb" controllers in that timing functions proceeded independently and without any feedback as to operating conditions in the pool system or the functioning or failure to function of the other water conditioning apparatus. Mechanical timers will turn on a filter pump and thereby pump pool water into a solar panel located on the roof of a building for a pre-set time period, e.g., four hours, in the middle of the day. If, however, the solar panel has developed a substantial leak, the timer will cause the pump to proceed for four hours to empty the pool by pumping water into the leaking solar panel.

Similarly, when "dumb" controllers are used, one timing function may turn on the gas heater, while another turns on the filter pump. If the filter pump should fail, however, the gas heater will still be operating, with a disastrous effect.

In terms of energy savings, "dumb" timers or controllers can only roughly attempt to achieve some economy in the use of energy. Solar panels can be set to operate during the time of day when solar energy is most likely to be available, filters can be set to function at night when the demand and cost of energy are lowest, and spas can be heated only in the late afternoon and evening, when they are most generally used. Such timing of pool water-conditioning functions, however, only approximates the optimum energy usage for the pool system, and the day-to-day climatic variations which occur will result in a need for constant supervision of the control functions or inefficient energy use, or both.

The ability to truly attain an energy-efficient recreational pool system requires a controller that not only can perform timed sequencing of water-conditioning functions, but can also sense the need for these functions, sense the operation of the equipment during performance of the functions, and preferably, can effect temperature switching as well as timed switching of the water-conditioning functions. Moreover, the ability to sense operation of the pool water-conditioning apparatus and to make control decisions based upon the operation of such apparatus allows the controller to protect the system against "mindless" continued operation that can eventually destroy or endanger the apparatus.

U.S. Pat. No. 3,906,928 discloses a solar-heater control system in which a limited attempt has been made to provide some feedback into a solar pool-heating system. In this patent, a solar-heat sensor is placed proximate the solar panels and is used to control the flow of water to the solar panels. While providing some improvement over a manual or time-switched system, the apparatus and method of U.S. Pat. No. 3,906,928 is relatively simplistic and inherently limited in its control functions.

A somewhat more complex control system for a recreational pool is shown in U.S. Pat. No. 3,809,116. In this system a controller is provided to maintain the liquid level in the pool within a given range. The system includes timed, demand and manual modes of operation, but basically the controller is provided by a relatively simple clock mechanism and a plurality of sensors in the form of switches that will override the clock mechanism. Still further, for most recreational pools the problem of, when to add water, pales by comparison to the water-heating and filtration problems.

OBJECTS AND SUMMARY OF THE INVENTION

A. Objects of the Invention

Accordingly, it is a object of the present invention to provide a controller for recreational pool systems which will enable enhanced efficiency in the use of energy in the operation of pool water-conditioning apparatus.

Another object of the present invention is to provide a controller and a method of controlling recreational pool systems which are capable of controlling electrically powered, pool-related apparatus based upon a combination of programmed input and actual operating conditions in the pool system.

Another object of the present invention is to provide a controller for recreational pool systems which is capable of interrelating the operation of pool water-conditioning apparatus as between a multiplicity of pools.

Still a further object of the present invention is to provide a controller for recreational pool systems which is capable of time-based and/or temperature-based operation of the pool water-heating apparatus.

Still another object of the present invention is to provide a controller for a recreational pool system which will protect the pool water-conditioning apparatus against destructive continued operation.

Another object of the present invention is to provide a controller for a recreational pool system which can be installed as original equipment or integrated into existing pool systems.

Still another object of the present invention is to provide a controller for a recreational pool system capable of operation of a multiplicity of pool water-conditioning apparatus on an independent, interrelated, or preferential basis.

Another object of the present invention is to provide a controller for a recreational pool system which is capable of sophisticated and complex control functions and yet is reliable and fail-safe in its operation.

Another object of the present invention is to provide a controller for a recreational pool system which is relatively inexpensive to construct and install, provides greatly increased flexibility of operation, and can be readily adapted for control of a wide variety of different pool system configurations.

The controller and method of controlling recreational pool systems of the present invention has other objects and features of advantage which are set forth in more detail in the following description of the preferred embodiment or will be apparent from the accompanying drawing.

B. Summary of the Invention

The recreational pool system controller of the present invention includes a plurality of sensing apparatus formed and positioned to sense conditions in the pool system, actuating means formed and coupled to electrically powered apparatus, such as water-conditioning apparatus, for actuation of the same, and programmable input means formed for receipt and storae of time sequence input and temperature input and formed to produce logic signals based upon such input. The controller also includes a circuit coupling the sensing apparatus, actuating means and input means together for control of the operating parameters of the pool system, and the improvement in the controller of the present invention is comprised, briefly, of providing the circuit as a logic circuit formed with a plurality of logic gates coupled to logic conversion means formed to convert signals from the sensing apparatus and the input means and formed to drive said actuating means only upon the existence of a sequence of predetermined logic states in the logic circuit. In the improved controller feedback from sensing apparatus in the pool system is combined by logic gates with input from the user of the controller to control such functions such as pumping, valve operation, solar water heating, non-solar water heating, filtration, spa operation, pool sweep operation, and hydromassage. The ability to program these functions with the controller on a timed- or temperature-switched basis enables the pool system to maximize the use of available solar energy and minimize the use of non-solar energy for both heating and filtration.

DESCRIPTION OF THE PREFERRED EMBODIMENT

Pool System

Figure 1:
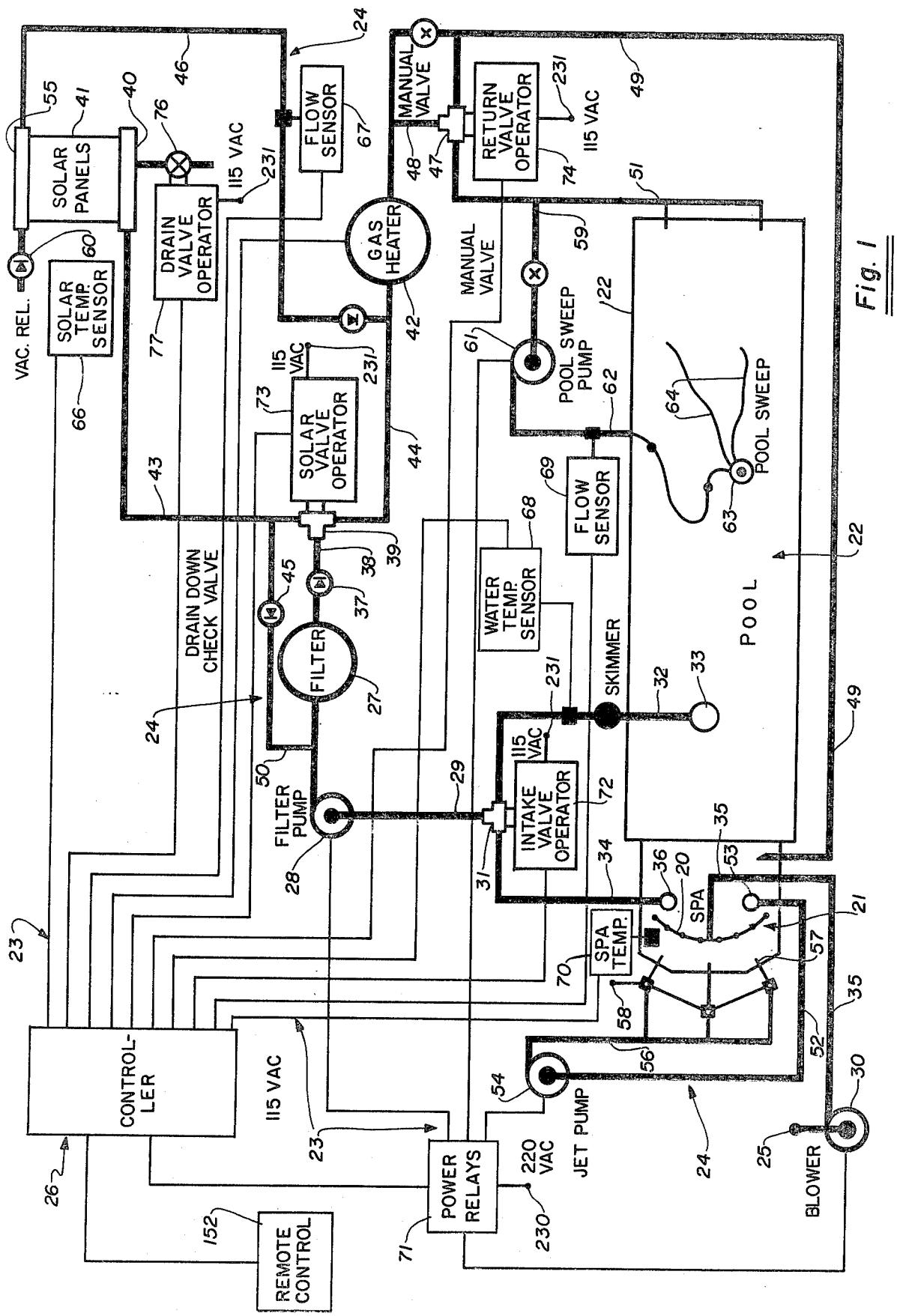
FIG. 1 is a hydraulic and electrical schematic representation of a recreational pool system having a controller constructed in accordance with the present invention.

The controller of the present invention can be advantageously employed to control the operating conditions of a pool system having a single pool, such as a swimming pool or a hot tube, but the many advantages of the present controller are best illustrated by a recreational pool system having a plurality of pools. As shown in FIG. 1, a spa 21 is installed in a position closely adjacent to a conventional swimming pool 22.

As is common for most pool systems, the pool system of FIG. 1 includes a variety of electrically powered, pool water-conditioning apparatus formed to heat, filter, agitate, clean and aerate the pool water. Additionally, other electrically powered apparatus may be employed in the pool system, such as lights around and in the pool and/or spa. Hydraulic circuit means, generally designated 24 and shown in FIG. 1 as relatively thick solid lines, couples the various water-conditioning apparatus for spa 21 and pool 22 for the flow of pool water through the water-conditioning apparatus in accordance with commands from controller means 26, which in the preferred form is electrically coupled by conductor means, generally designated 23 and shown in FIG. 1 by relatively thin lines, to the pool water-conditioning apparatus.

As used herein, the expression "pool" shall include swimming pools, spas, hot tubs or other recreational pools of water. The expression "pool water" shall similarly mean water that is circulating in the pool system, whether or not it is directed to or from the swimming pool, spa, hot tub or the like. Moreover, as used herein the expressions "pool related conditioning apparatus" and "conditioning apparatus" shall include apparatus for heating and filtering the pool water and shall further include electrically powered or actuated pumping apparatus, valves, lighting, apparatus to aerate the pool water and apparatus to clean the pool.

Hydraulic Circuit

In the pool system of FIG. 1, a conventional swimming pool filter 27, together with its filter pump 28, are coupled by conduit 29 to an intake valve 31. Extending from valve 31 is a first conduit 32, that terminates in intake inlet 33 in swimming pool 22, and a second conduit 34, which terminates in intake 36 located in spa 21. The intake valve 31, therefore, can be operated so that pump 28 will withdraw water selectively from either the spa or the swimming pool and pump the same into filter 27 for filtration purposes.

After filtration, the pool water passes through check valve 37 in conduit 38 to valve 39. The swimming pool system of the present invention is provided with solar water-heating apparatus, such as solar panels 41, and non-solar water-heating apparatus, such as gas heater 42. Accordingly, valve 39 is coupled to conduit 43 for flow of water to solar panels 41 and is also coupled to conduit 44 for the flow of water to gas heater 42. The return of pool water from solar panels 41 is provided by conduit 46 that preferably joins conduit 44 in advance of gas heater 42 so that both solar and non-solar water heating can be employed in series if desired.

In order to purge air flow from solar panels 41, which air would reduce panel efficiency if trapped in the panels, conduit 43 is coupled to a lower side 40 of the panels while outlet conduit 46 is coupled to an upper side 55 of panels 41. As water is introduced into the panels, water and air rise to outlet conduit 46, and the panels are purged of air for maximum heat transfer to the pool water.

When the flow of pool water to panels 41 is terminated, for example by switching valve 39 (also referred to as the "solar valve") for the flow of water to gas heater 42, vacuum release 60 permits air to enter the panels, and water will drain down through conduit 43 to conduit 50. Drain-down check valve 45 permits the flow of water through conduit 50 and back through filter pump 28 to the pool or spa. If pump 28 is operating, the pool water draining from panels 41 will be pumped into the filter and to gas heater 42.

In order to control the return flow of pool water as between spa 21 and pool 22, return valve 47 is coupled to conduit 48 from gas heater 42 and is further coupled to return conduit 49 for spa 21 and to return conduit 51 for pool 22. By selection of the position of intake valve 31 and return valve 47, therefore, it is possible to filter and heat water in either the swimming pool or the spa.

Moreover, valves 31 and 47 can be operated so as to empty the spa into the swimming pool for cleaning of the spa and to refill the spa from the swimming pool. Valves 31, 39 and 47 can advantageously be provided by valves constructed in accordance with U.S. Pat. No. 3,938,553.

Hydraulic circuit 24 further preferably includes a hydromassage circuit in which there is an intake conduit 52 having an inlet opening 53. Conduit 52 is connected to hydromassage or jet pump 54, and the jet pump returns the pool water through conduit 56. A manifold having a plurality of hydromassage heads 57 is connected to conduit 56, and an air intake 58 that can be adjusted so as to vary the amount of air that is injected at the hydromassage heads is also provided. Additionally or alternatively, blower 30 having air intake 25 can be coupled by conduit 35 to an air discharge manifold 20 to provide water agitation in spa 21. The construction and operation of the hydromassage circuit is conventional and well-known in the recreational pool industry.

Finally, the hydraulic circuit of the pool system of FIG. 1 includes a conduit 59 downstream of return valve 47 which leads to a pool sweep pump 61, a return conduit 62 and pool sweep apparatus 63. The pool sweep apparatus is of the type conventionally available on the market and functions to discharge pool water from the flexible arms 64 as they sweep along the bottom of swimming pool 22 so as to move sediment to the main drain.

As thus described, the various components of the hydraulic circuit of the pool system of the present invention are conventionally formed and do not by themselves constitute a novel portion of the present apparatus or method. Moreover, alternate hydraulic circuits employing the same and/or supplementary pool water-conditioning apparatus and lighting apparatus can be employed with the controller and method of the present invention.

Control Preferences and Parameters

Prior to setting forth the details of construction and operation of the controller and method of the present invention, some of the typical or most frequently desired pool system operating preferences and parameter can be described.

1. Solar Heating Preference

For virtually all recreational pool systems having a solar heating capability, solar heating, when possible, will be preferred to non-solar (usually gas or electric) heating. Obviously, solar heating preference will tend to minimize the cost of energy for the pool system. While solar heating preference will normally be desirable, the controller should also have the capability of permitting gas heating instead of or in addition to solar heating.

2. Pool or Spa Preference

The individual users of multiple pool systems may have a preference between pool 22 and spa 21 as to which body of water is heated first. This is particularly true when solar heating is also preferred. Some users, for example, prefer to solar heat the pool and gas heat the spa, if necessary. Others may use their spa more than their pool and prefer spa heating to pool heating.

3. Temperature Controlling

The operating temperature of the various bodies of water comprising the recreational pool system can vary according to the time and purpose for which they are used. Spas will normally be operated at an elevated temperature as compared to swimming pools. Neither the spa nor pool will see much use during the late night hours. Moreover, a lower temperature may be acceptable if non-solar heating is required while a higher, more comfortable temperature may be preferred if solar heating can be used. In any event, operation of the pool system in accordance with pre-set temperature criteria may be more important than operation in accordance with pre-set time criteria.

4. Switching of Spa and Pool Heating

It is desirable to be able to effect switching of pool water heating from pool to spa, or vice versa, upon a temperatures basis, a timed basis and manually. Which is preferred can vary according to pool and spa use and solar energy availability. Thus, if solar energy is more than ample to heat both the pool and spa, and spa use is only at the end of the day, the user may employ temperature switching with pool preference. If solar heating is not sufficient or the spa is to be used early in the day, timed switching—possibly with gas heating—may be employed. At any time manual override may be necessary to provide complete flexibility.

As will be seen, therefore, various combinations of solar and gas heating, spa or pool preference, and temperature or timed switching are highly desirable to enable maximum energy efficiency for the particular use patterns of each individual pool system owner.

Controller Means

The operation of the various electrically powered, pool-related apparatus described in the hydraulic circuit is controlled by controller means. As used herein, the expression "controller means" shall include not only the circuitry controlling switching and timing, but also the sensing apparatus, actuating means and input means.

The sensing apparatus and the actuating means are both connected by electrical conductors 23 to central controller 26, and the controller preferably further includes programmable and other input means formed for receipt and storage of time sequence and temperature input and further formed to produce timing-based and temperature-based signals as a result of such input.

1. Sensing Apparatus

As can be seen in FIG. 1, a plurality of sensing apparatus are positioned to sense conditions in the pool system and are formed to produce a signal in response to these conditions. Thus, a solar temperature sensor 66 is positioned proximate solar panels 41, a water flow sensor 67 is positioned in the hydraulic circuit downstream of the solar panels to sense the flow of water from the solar panels, a pool water temperature sensor 68 is positioned to sense water temperature in pool 22, a second water temperature sensor 70 is positioned in spa 21 to sense the pool water temperature in the spa, and a water flow sensor 69 is positioned to sense the flow of water from pool sweep pump 61 back to the pool. Other sensing apparatus can be provided, for example, a flow sensor (not shown) in hydromassage return conduit 56, and a water temperature sensor downstream of the solar heater (to sense the increase in water temperature during solar heating).

As is described hereinafter in detail, the controller means of the present invention includes a logic circuit that effects control of the various electrically powered, pool-related apparatus. The sensing apparatus forming a portion of the controller means must be formed to produce a logic signal input to the logic circuit or be coupled to signal conversion means that will produce a logic signal input. Temperature sensors 66, 68 and 70 are coupled to converters and comparators which convert the temperature signals to logic signals, in a manner which will also be more fully described. Flow sensors 67 and 69 produce a logic input signal and may be directly coupled to the logic circuit.

2. Actuating Means

The controller means of the present invention further includes actuating means formed and coupled to the electrically powered, pool-related apparatus for actuation of the same. In the case of pumps 28, 54 and 61, actuating means in the form of power relays 71 that are coupled by drive circuits to the logic circuit of the controller are provided. Valves 31, 39 and 47 are actuated by valve operators 72, 73 and 74, respectively, which are coupled to the logic circuit through drive circuits. Additionally, it is preferable to provide the solar panel 41 with a drain valve 76, which is also actuated by valve operator 77 and drive circuit coupled to the logic circuit.

3. Input Means

The controller means of the present invention includes a variety of input means. Such input means includes a programmable timer which is capable of logic signal input to the controller logic circuit and which can be programmed or set by the user to input signals to the logic circuit during a plurality of desired time intervals. Additionally, input means includes temperature setting input apparatus for the spa and pool, and pool filtration setting apparatus.

Logic Circuit

As above described, the pool system, the water-conditioning apparatus and the sensing and actuating devices are more complex and sophisticated in nature than would be conventionally found in prior recreational pool systems. To the extent even portions of such equipment can be found in prior pool systems, they have been operated by "dumb" controllers which are essentially clock or timing mechanisms used to switch the equipment on or off with little or no regard to actual pool operating conditions or the functioning or failure to function of other equipment in the system.

The improved controller means of the present invention not only is capable of control and operation of the relatively complex and sophisticated pool system above set forth, but utilizes input and feedback from the pool system and the electrically powered, pool-related equipment to determine the manner in which the pool equipment is operated.

In the improved controller means of the present invention a logic circuit is provided and couples the sensing apparatus, actuating means and programmable input means together for operation of the electrically powered, pool related apparatus. The logic circuit is formed with a plurality of logic gates which require predetermined combinations of logic states to actuate the pool equipment. Thus, the logic circuit requires various combinations of logic state which depend upon events as sensed by the sensing apparatus or programmed by the input means before the various water-conditioning equipment is operated or shut down. Feedback from the pool system is thereby combined with input from the user to produce maximum energy efficiency, to protect the equipment from self-destructive operation, and to maximize the flexibility with which the pool owner may operate the pool system.

Figure 2:
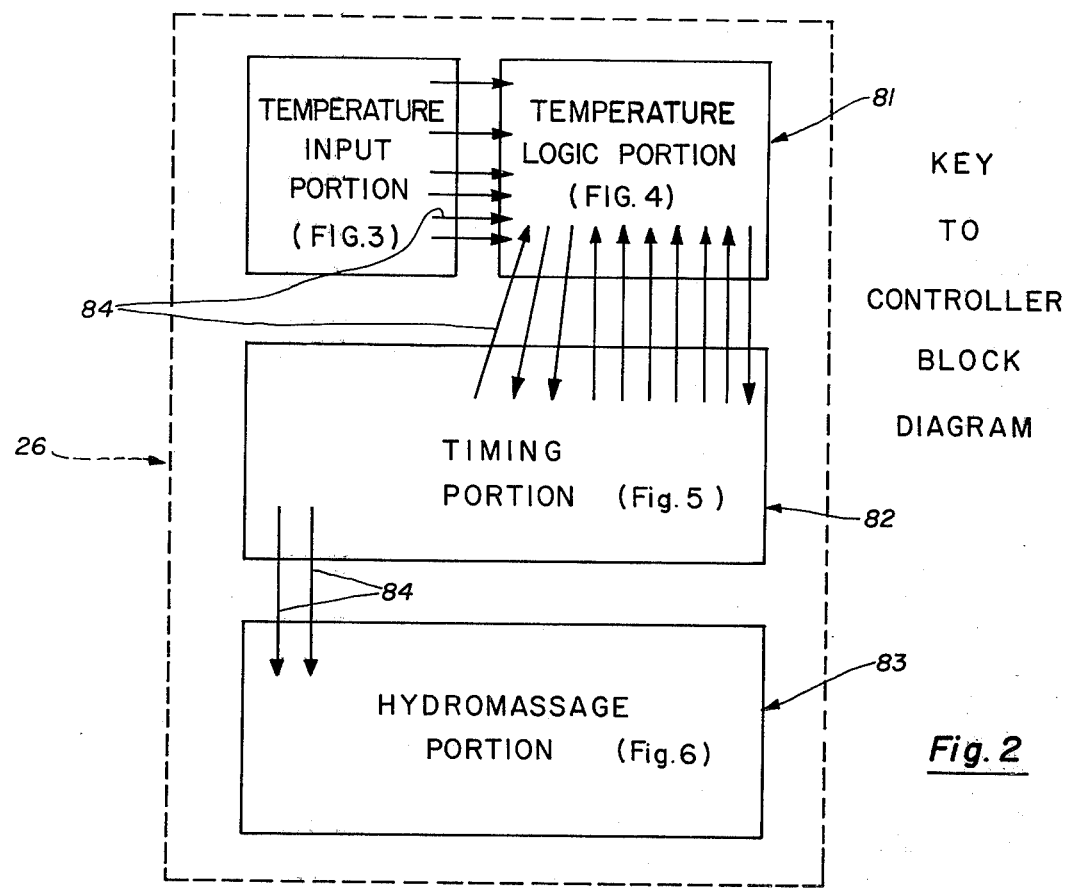
FIG. 2 is a key diagram interrelating the portions of a block diagram for a controller constructed in accordance with the present invention.
Figure 6:
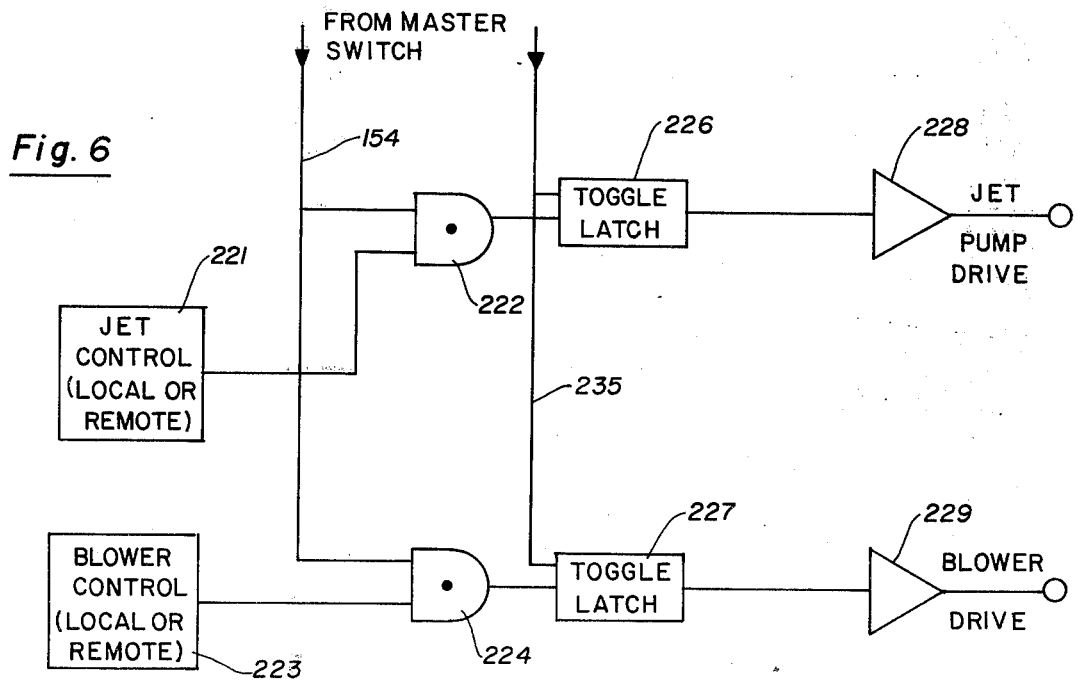
FIG. 6 is a block diagram of a hydromassage portion of the controller of the present invention.

The logic circuit of the controller means of the present invention can best be understood by reference to FIGS. 2 through 6. The logic circuitry for the controller has been divided into four positions, primarily for ease of illustration in the drawings. Thus, as is shown in FIG. 2, the logic circuit includes a "Temperature Input Portion," generally designated 80 and shown in detail in FIG. 3; a "Temperature Logic Portion," generally designated 81 and shown in detail in FIG. 4; a "Timing Portion," generally designated 82 and shown in FIG. 5; and a "Hydromassage Portion," generally designated 83 and shown in FIG. 6. As will be seen from FIGS. 2 through 6, these various portions are interconnected at the common connections 84, and all three portions function together as an integrated unit.

In the broadest aspect, the logic circuit need not be electrically based. A pneumatic logic circuit, for example, can be employed in the controller of the present invention. It is preferable, however, to use an electrical logic circuit, and the details of construction of a typical logic circuit suitable for use with the controller of the present invention is hereafter described.

1. Temperature Input

As may be seen in FIG. 1, solar-temperature sensor 66 is positioned proximate solar panels 41, and pool water temperature sensor 68 is positioned in conduit means 32 in advance of intake valve 31, while temperature sensor 70 is positioned in spa 21. Both the solar temperature sensor and the water temperature sensors are preferably provided as current-based, solid state, linear temperature sensor-transmitters (non-thermistor type). The output of such temperature sensors would not normally be a logic signal, but all three sensors are coupled to converter means to provide a logic state input to the logic circuit. Thus, current-to-voltage converters are provided so that the signal from the temperature sensors will be converted to a voltage-based signal and can be passed to voltage-based comparators, which in turn produce digital logic outputs to the logic circuit of the present invention.

Figure 3:
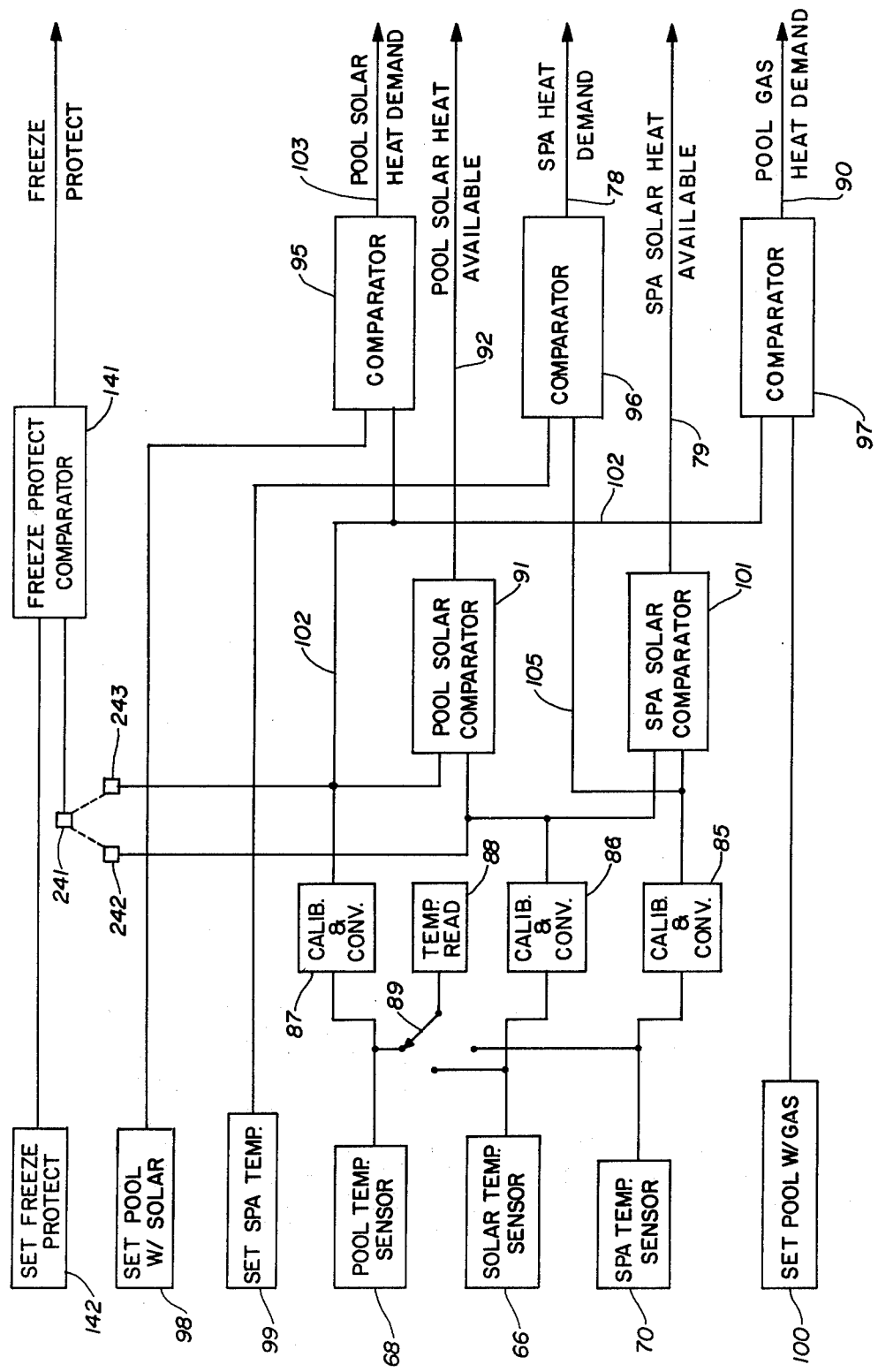
FIG. 3 is a block diagram of a temperature input portion of the controller of the present invention.

Additionally, all three temperature sensors should be provided with calibration means, and the calibration and converter apparatus are schematically illustrated in FIG. 3 by a single block at 86 for the solar temperature sensor and at 87 for the pool water temperature sensor, and at 85 for the spa water temperature sensor, although it will be understood that calibration and conversion are two separate functions. It is preferable, although not required, that the controller of the present invention include the temperature-reading means 88 which can be selectively switched by switch 89 so as to enable reading at the controller of the solar temperature, the spa water temperature or the pool water temperature. A digital display of the temperature can also be provided.

Solar temperature sensor 66 provides a temperature reading which is a combination of ambient and radiant energy. During the day, solar sensor 66, which is positioned in the sun light, reads the availability of radiant energy. At night the solar sensor senses the ambient temperature to provide a freeze-protect function, as more fully set forth hereinafter.

The provision of both pool temperature sensor 68 and spa temperature sensor 70 is used to prevent endless temperature cycling or switching of valve 31, which could occur if a signal sensor were provided in conduit 29.

In order for solar energy to be used to heat the pool water, there must be solar heat available, as compared to the pool water temperature, and it is not realistic to simply assume that solar heat will be available during certain times of the day. Cloud cover and the like may interfere or solar heat may be available longer on some days than might be assumed for an "average" day. Accordingly, the controller of the present invention includes a pool-solar comparator 91 electrically coupled to the output of solar temperature sensor 66 and pool water temperature sensor 68 and formed to produce a digital output signal to the logic circuit at conductor 92. If, for example, the solar temperature is in excess of the water temperature in the pool, a logic 1 or "true" signal exists, and if it is less, a logic 0 or "false" exists at the output of comparator 91. The logic signal from comparator 91 is communicated through conductor 92 to AND gate 93 (FIG. 4) to indicate at the AND gate that solar heat is or is not available for heating the pool water being sensed by sensor 68. Thus, conductor 92 is labeled the "Pool Solar Heat Available" line.

In a similar manner solar sensor 66 an spa water temperature sensor 70 are coupled to spa-solar comparator 101, which will input AND gate 139 (FIG. 4) with a logic 1 signal through conductor 79 when the solar temperature is greater than the water temperature in the spa.

The recreational pool user will want to input the controller as to the desired operating temperatures for both the spa and the swimming pool. The input means of the controller means of the present invention, therefore, includes apparatus for setting or inputting the controller as to the temperature level of the water in swimming pool 22 and in spa 21. This can be accomplished by providing the input means, in part, as temperature-setting apparatus 98, 99 and 100, which are coupled to comparators 95, 96 and 97, respectively. Comparators 95 and 97 are further connected to common conductor 102 from temperature sensor 68 for the pool water temperature so as to enable comparison of the water temperature in pool 22 with the pre-set temperatures input to the controller through setting apparatus 98 and 100.

As shown in FIG. 3, the comparator 95 compares the water temperature in the pool with the user's input or setting for the desired water temperature to which the swimming pool should be heated with solar heating. Comparator 97 compares the water temperature in the pool to a setting for the swimming pool water temperature when gas heating is employed and provides a logic output to AND gate 110 through conductor 90. Comparator 96 is input by spa temperature setting device 99 and spa water temperature sensor 70 (by conductor 105), and comparator 96 provides a logic 1 output to AND gate 136 (FIG. 4) through conductor 78 when the spa water is at a temperature below the input setting.

All of the input setting devices 98, 99 and 100 set ceilings to which water will be heated. The setting at input device 100 will normally act as the minimum temperature at which the user wishes to maintain the swimming pool. A typical setting might be 78° F. The input device 98, by contrast, would be set at a higher level, namely, a level at which the user would like to have the swimming pool heated if such heating can be accomplished through the use of the solar-heating apparatus. Thus, the setting of input device 98 might be 85° F. The spa water temperature will normally be set to be much higher than that of the swimming pool water. Input devices 99, therefore, might be set at 100° F.

a. Temperature Switching with Pool Preference

Figure 4:
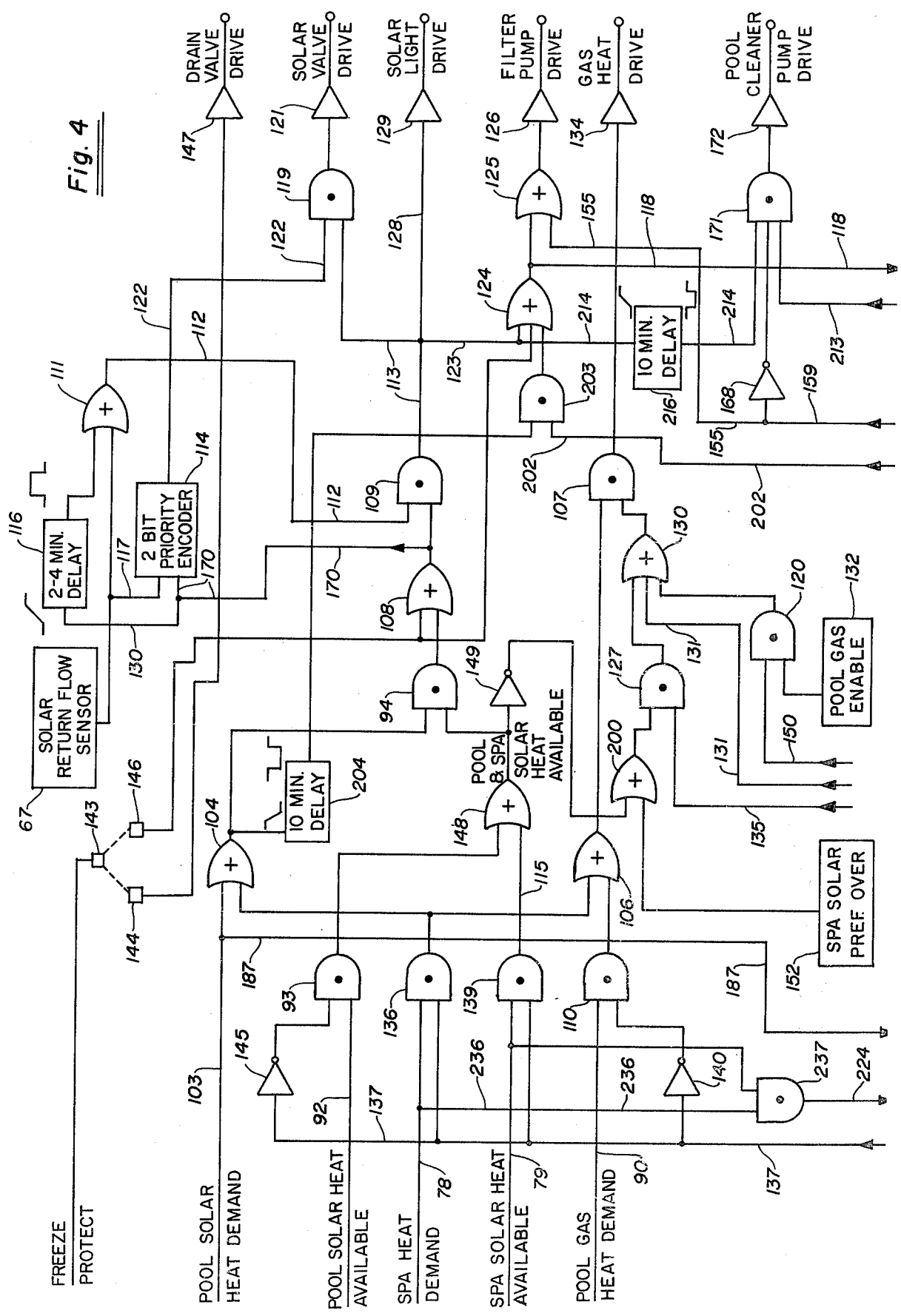
FIG. 4 is a block diagram of a temperature logic portion of the controller of the present invention.
Figure 5:
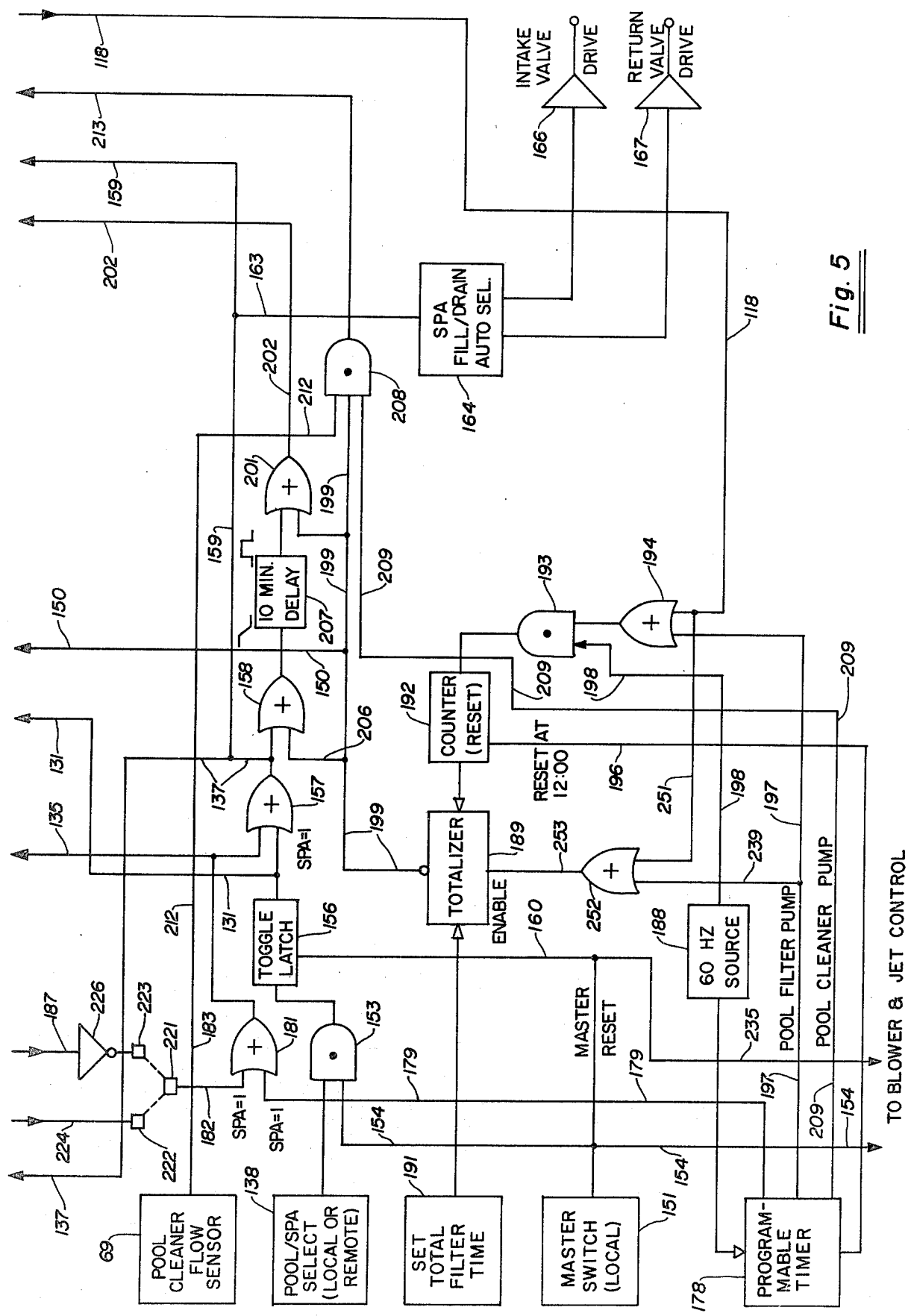
FIG. 5 is a block diagram of a timing portion of the controller of the present invention.

Assuming for the purpose of illustration that the controller is strapped for "pool preference" (strapping for pool or spa preference is described in detail below), and assuming further that temperature-based switching is occuring, the operation of the temperature sensors and temperature input can be set forth. If the pool water temperature is 70° F., comparator 97 will produce a digital logic 1 signal to AND gate 110, and comparator 95 will produce a digital logic 1 signal at the input to OR gate 104. The logic 1 signal from comparator 95 is also input to inverter 226 (FIG. 5) through conductors 103 and 187. A logic 0 is presented at time and temperature switching OR gate 181 (as a result of tne inverter and strapping between terminals 223 and 221), and this logic 0 signal appears at OR gate 157 and conductor 137, which in turn inputs a logic 0 (indicating "pool mode") to inverter 140 (FIG. 4). The output of inverter 140 is therefore a logic 1, which, together with the logic 1 output from comparator 97, results in a logic 1 input to OR gate 106.

Since both gates 104 and 106 are OR gates, the logic 1 states will be present at the inputs to the next gates in the logic circuit, namely, AND gates 94 and 107. Before AND gate 94 will input OR gate 108 with a logic 1, a logic 1 signal must also be input from OR gate 148. OR gate 148 receives logic signals from both the pool-solar comparator 91 and spa-solar comparator 101. Both of these inputs have AND gates (namely, AND gates 139 and 93) interposed between the comparators and OR gate 148. Both of these AND gates are also input through conductor 137 by logic signals indicating whether the system is in the "pool mode" or "spa mode" of heating.

In the example, the system is strapped for pool preference and is in the pool heating mode. Accordingly, a logic 0 will be present in conductor 137 (as above explained). This logic 0 will be input to AND gate 139, which will therefore input OR gate 148 through conductor 115 with a logic 0. Inverter 145, however, will invert the logic 0 in conductor 137 and input a logic 1 to AND gate 93, thus inputing OR gate 148 with a logic 1 and thereafter AND gate 94.

A logic 1 at both inputs to AND gate 94 indicates that there is solar heat demand from either the spa or pool (in this case the pool) and that there is solar heat availability. A logic 1 signal is therefore input to OR gate 108 and then AND gate 109. The other input to AND gate 109 comes from a portion of the logic circuit which senses return of water from the solar panels so that the pump will not continue to pump water into a leaking solar panel. This will be more fully explained below, but conductor 170 is also input from AND gate 108 and will normally produce a logic 1 at the second input 112 to AND gate 109.

The logic 1 output from AND gate 109 is input to OR gate 124 and then to OR gate 125 in advance of the filter pump drive 126, and the filter pump is actuated. The logic 1 signal from AND gate 109 is also input to AND gate 119, which is also input with a logic 1 from conductor 122 from the solar return sensor and start up circuit for all conditions except a leaking solar panel. Thus, the output from AND gate 119 to solar valve drive 121 causes the solar valve 39 to be switched for the flow of pool water to the solar panels.

The presence of solar heat demand for the pool or spa plus solar heat availability will turn on pump 28 and switch solar valve 39 for the flow of water to solar panels 41.

Assuming further that the solar temperature sensed by solar sensor 66 is 83° F., water will be withdrawn from pool 22 (explained below) and the water temperature (75° F.) will be sensed and found to be below both the pool with gas heating (assumed to be set at 78° F.) and the pool with solar heating (assumed to be 85° F.). Moreover, the 75° F. water temperature will be below the 83° F. solar heat availability temperature. Accordingly, solar heating will occur, as above explained. Additionally, however, gas heating of the pool water may also be taking place.

Since comparator 97 is indicating that the pool temperature is below that of the pool temperature set for gas heating by input 100, and since the system is in pool mode, a logic 1 signal is input to AND gate 107. The other input to AND gate 107 can come from several sources. First, OR gate 130 must be input with a logic 1. This will occur if a logic 1 is present in conductor 131.

A logic 1 will only be present in conductor 131 only if the pool system is in the spa mode, which the system can be manually forced into by input through pool/spa select switch 138. In the present example, however, the system is in pool mode, and a logic 0 will be present in conductor 131.

A second input to OR gate 130 comes from AND gate 127, which in turn receives an input through conductor 135 from the temperature-time switching OR gate 181. Since it has been assumed that temperature switching is occuring, inverter 226 will cause a logic 0 to be present at OR gate 181, indicating pool mode, and that logic 0 signal will be input to AND gate 127 and accordingly OR gate 130. The other input to AND gate 127 will be described when considering operation of the system in spa mode.

The final input to OR gate 130 comes from AND gate 120. AND gate 120 is input from gas enable input switch 132 and conductor 150, which is coupled to Timing Portion 82 of the circuit. Accordingly, if the timing portion of the circuit is programmed for operation of the filter pump and the system is manually input by the gas enable switch 132, a logic 1 will be present from AND gate 120 and input to OR gate 130 and AND gate 107 to drive gas heater actuating circuit or driver 134 and turn on the gas heater.

Both gas heating and solar heating of the pool water will take place; however, in order to conserve energy, gas heating requires manual input through pool gas enable switch 132. Without such input only solar heating will occur when solar heating is available. In fact, in the logic circuit illustrated, gas heating of the pool will not occur even if there is a gas heat demand and no solar heat available for a system strapped for pool preference, unless gas heat enable switch 132 is input to permit gas heating. Leaving the gas enable switch in an "on" position will result in automatic gas heating of the pool to the temperature set for the pool with gas heating, even at night, unless the filter pump is not programmed to operate, which it normally will be at night, as will be set forth below.

Accordingly, the system is constructed to permit gas heating in the pool mode, but to favor solar heating and further to require a conscience override to achieve gas heating in the pool mode. Moreover, if solar heating is available, gas heating will be augmented by solar heating.

Returning to the numerical example, as the pool water temperature rises to 78° F., the preset pool with gas heating level, the gas heat demand signal will become a logic 0, and the gas heater, if enabled, will shut down for failure to receive a logic 1 input from OR gate 106. Comparator 95, however, will still indicate that there is a pool solar heat demand and produce a logic 1 "true" signal, since the preset pool temperature with solar heating was 85° F.

Solar heater 41 will continue to heat the pool water until the pool water temperature rises to 83° F. When the pool water temperature reaches 83° F., however, comparator 91 will no longer produce a "true" solar-heat-available signal, and solar heating will terminate. If the solar conditions change and more solar energy is available, the solar heater will again be actuated and continue to heat the pool water until the preset water temperature of 85° F. is reached. Once this upper temperature is reached, heating of the pool will cease even though solar heat is available.

Once pool water in pool 22 is heated to 85° F., the logic 0 signal from comparator 95 will be communicated to inverter 226 through conductors 103 and 187 and inverted to a logic 1 signal indicating that the system is now in spa mode. The logic 1 signal from inverter 226 is input through OR gates 181 and 157 and back through conductor 137 to the Temperature Logic Portion of the circuit, and more particularly AND gates 139 and 136 (as well as inverters 140 and 145, which now invert to logic 0 signals).

If the solar heat availability temperature has risen to 95° F. and the spa water temperature is currently 90° F., comparator 101 will also input AND gate 139 with a logic 1. The result is a logic 1 input to OR gate 148 and AND gate 94 indicating spa solar heat availability. Since the preset spa temperature is 100° F., comparator 96 indicates that there is a spa heat demand in that the spa water temperature is only 90° F. A logic 1 signal is present at AND gate 136 from comparator 96 and from conductor 137 (spa mode) and such signal is accordingly input to OR gates 104 and 106. The input to OR gate 104 is present at AND gate 94 indicating both spa solar heat demand and spa solar heat availability. The spa is, therefore, solar heated until the temperature rises to 95° F. Switching of the valves 31 and 47 for flow of water to and from the spa in response to the spa mode signal will be described below.

Once the pool water in spa 21 reaches 95° F., however, further circulation of the pool water into the solar panels would only cool the pool water. Comparator 101 will produce a logic 0 signal indicating there is no more solar heat available to heat pool water in spa 21. This in turn will input AND gate 139, OR gate 148 and AND gate 94, thus shutting down solar heating.

As set forth above, the logic 1 signal from comparator 96 indicating spa heat demand is input to logic OR gate 106, as well as OR gate 104. When the pool water in the spa rises to 95° F. solar heating shuts down, but spa heat demand continues because the preset spa temperature is 100° F. Thus, the logic 1 signal OR gate 106 is present at AND gate 107. The other input to AND gate 107 from OR gate 130 can also be a logic 1. If the manual pool/spa switch is depressed, a logic 1 will be present at OR gate 130 from conductor 131.

Even if there is no manual input, the presence of a logic 1 signal at the temperature-time switching OR gate 181 (FIG. 4) results in a logic 1 input (through conductor 135) to AND gate 127. The other input to AND gate 127 is from OR gate 200, which is input from one of two sources. First, OR gate 200 is input from inverter 149 from OR gate 148. Since the output of OR gate 148 indicates whether or not there is spa or pool solar heat available, and since in the example there is no solar heat available, the logic 0 at the output of OR gate 148 is inverted by inverter 149, and a logic 1 input to OR gate 200, AND gate 127, OR gate 120 and AND gate 107. This produces automatic gas heating of the spa when solar heat is no longer available.

The other input to OR gate 200 in spa solar preference override switch 152. This switch enables the user to force gas heating of the spa, even though solar heating is available. Thus, when solar heating of the spa is available, the input to inverter 149 from OR gate 148 will be a logic 1, which is inverted to a logic 0. Switching switch 152 to an "on" position, however, will input OR gate 200, AND gate 127, OR gate 130 and AND gate 107 with a logic 1, causing gas heating in addition to solar heating. Again it is a feature of the present logic circuitry that a manual override is necessary to cause gas heating of the pool water in the spa when solar heat is available.

Once the spa is heated to 100° F., all gas and solar heating is shut down, since there is no more heat demand for either the pool, now at 85° F., or the spa, now at 100° F.

b. Temperature Switching with Spa Preference.

In the previous example the system was strapped between terminals 221 and 223 for temperature switching with pool preference. In some instances users may wish to heat spa 21 in preference to pool 22. This may be accomplished by strapping between terminals 221 and 222, which causes the temperature-time switching OR gate 181 to receive input from conductor 224 instead of conductor 187.

The spa preference temperature switching results from the output of comparator 96. If there is spa heat demand, a logic 1 is communicated from comparator 96 through conductors 78 and 236 to AND gate 237. The logic 1 signal from AND gate 237 "spa mode" and is returned to the Temperature Portion of the logic circuit through conductors 135 and 137 to solar heat pool water in the spa, as above described under the temperature switching, pool preference section.

When the pool water in the spa is heated to the preset temperature (100° F.) a logic 0 from comparator 96 is input to AND gate 237 and OR gate 181, switching the system to pool mode. The logic 0 at OR gate 181 is inverted at inverters 140 and 145 to activate AND gates 93 and 110, which control pool heating. Pool heating then occurs as described under the temperature switching with pool preference section.

Thus, a spa preference strapping will cause heating of the spa first and then the pool, while pool preference strapping causes heating of the pool first and then the spa. In either pool or spa preference gas heating will not occur unless there is a manual override, or the system is in the spa mode and no solar heat is available. The exception for spa heating by gas when no solar is available is believed to be an acceptable energy use since the size of the spa and the amount of heating required will be relatively small.

c. Time-based Mode Switching.

The logic circuit of the present invention is capable of time-based as well as the above-described temperature-based mode switching. In time-based operation the heating in spa mode and pool mode may be determined by programmable timer 178 (FIG. 5), as well as by the temperature of the pool water.

For the purpose of illustration assume that the system is strapped for pool preference. Moreover, assume that at 5:00 p.m. each evening the pool owner wants to heat the spa for 2 hours, regardless of whether or not the pool is heated to 78° F. This condition may occur regularly during winter months. Programmable timer 178 will produce a logic 1 signal in conductor 179 which inputs OR gate 181. The system will switch to spa mode even though the temperature switching input to OR gate 181 is a logic 0.

The logic 1 from timer 178 through OR gate 181 is communicated to activate AND gates 139 and 136 through conductors 183 and 137. Usually there will be no solar heat available and a logic 0 output from OR gate 148 to inverter 149 will activate the gas heater if there is spa heat demand. When the spa reaches 100° F., the logic state at the input to AND gate 136 from comparator 96 will change to 0, shutting down heating.

The system will stay in spa mode for the entire 2 hours programmable timer 178 inputs a logic 1 to temperature-time switching OR gate 181. When the timed operation of the spa terminates the timer will change to a logic 0 output and the input from the temperature portion will also be a logic 0, and the system will switch to pool mode. If solar heat is not available, gas heating of the pool can be accomplished only by employing gas enable switch 132.

The effect of spa preference strapping is to essentially make time-based switching of modes unnecessary through OR gate 181. The system will spa heat as soon as there is spa heat demand. Accordingly, the temperature switching will maintain the spa at its preset temperature at all times and programmed switching to spa by timer 178 will not be necessary.

If the user wants to insure heating of the pool during predetermined hours when in spa strapped preference, without effecting switching between modes, this can be accomplished by programming timer 178 to produce a logic 1 signal through conductor 197 to turn the pump on during certain hours, say 1:00 p.m. to 4:00 p.m. Additionally, the gas heat enable switch can be turned on, and when the system temperature switches from spa to pool mode, timer 178 will cause a logic 1 through totalizer 189 and conductor 150 to AND gate 120. This will turn on the gas heater to heat pool 21 during the programmed time period. The spa will also be kept at the preset temperature by temperature switching, but whenever the system temperature switches to pool mode, the pool will be gas heated until the preset pool temperature with gas heating is reached.

2. Filter Pump Operation

Both solar and gas heating of pool water are accomplished by operating filter pump 28. In the logic circuit of the present invention heating of pool water cannot take place without operation of the filter pump, although the filter pump can, and often will, operate without heating, namely, when only filtration is taking place.

The filter pump drive 126 (FIG. 4) is actuated and the filter pump driven when a logic 1 signal exists at the output of OR gate 125. Such an output will occur if there is a logic 1 present at OR gate 124 from one of AND gate 203, AND gate 109 or recirculation terminal 146. Additionally, a logic 1 can be input through conductors 155 and 159, which receive logic signals from OR gate 157 (FIG. 5) and mode switching OR gate 181. Thus, any time the system is in spa mode, a logic 1 will be input to OR gate 125 and actuate filter pump drive circuit 126. When the system is in pool mode, however, activation of the filter pump requires input from OR gate 124.

The three inputs to OR gate 124 which will turn on pump 28 include terminal 146, which will have a logic 1 signal if freezing of water in the system is imminent and the recirculation option has been strapped into the logic circuitry, as will be more fully explained hereinafter.

A logic 1 signal will be input from AND gate 109 to OR gate 124 when both solar heat availability and solar demand are present, as was above explained, and a logic 1 input to AND gate 109 exists from conductor 112. The input to AND gate 109 from conductor 112 is provided by flow sensor 67 and start-up apparatus which allows the system to operate until water is sensed to be returning from solar panels 41. Thus, if there is solar heat demand, solar heat availability and water returning from the solar panels, the filter pump will be actuated by a logic 1 signal at the output of AND gate 109.

The third input to OR gate 124 is from AND gate 203. As will be seen from FIG. 4, there are two inputs to AND gate 203. Delay 204 produces a logic 1 output at all times, except when the logic state input to delay 204 changes from 1 to 0. Such a change occurs when there is no longer pool or spa solar heat demand, and the effect is to shut down the filter pump by producing a logic 0 at AND gate 203. The purpose of the pump shut down is described below.

Except for the limited condition of termination of pool and spa solar heat demand, therefore, AND gate 203 essentially is controlled by the logic state of the output of OR gate 201 (FIG. 5) from the Timing Portion of the logic circuit. As is explained in more detail, either a timing signal from programmable timer 178, or a manual override by pool/spa select switch 138 commanding spa operation can cause a logic 1 at the output of OR gate 201, which will be communicated through conductor 202 to AND gate 203 and from there to OR gate 124 and 125 to actuate the filter pump.

Filter pump 28, therefore, operates whenever there is:
a. solar heat demand, solar heat availability, and water returning from the solar panels (solar heating of the pool or spa); or
b. programmed or timed operation of the filter pump from the Timing Portion of the logic circuit (filtration only of the water and gas heating of the pool); or
c. heating of the spa—particularly gas heating; or
d. freezing in the system and the logic circuit is strapped for a water circulation option.

3. Solar Panel Leak Protection

The controller of the present invention provides for important protection from potentially disasterous continued pumping of pool water into a solar panel having a substantial leak. Minor leaking will normally not be very serious, but continued filter pump operation when the water is being pumped to a solar panel having a major leak could result in the pumping of large quantities of water out of the pool and onto the pool owner's property.

Flow sensor 67 will produce a digital logic output signal to OR gate 111 (FIG. 4) and from there through conductor 112 to AND gate 109. The presence of a signal from the solar return-flow sensor indicates that it is safe to continue to pump water to the solar panels for solar heating.

In a start-up condition, however, there will be no flow in conduit 46 which could be sensed by flow sensor 67. Thus, the filter pump must operate for some period of time before water could be expected to return from the solar panels through conduit 46. In order to enable this start-up, a 2-bit priority encoder 114 is provided and coupled to delay means 116, which in turn is coupled to OR gate 111. Encoder 114 is further coupled by conductor 170 to the logic circuit just beyond OR gate 108. Thus, any time there is either spa or pool solar heat demand and solar heat availability, a logic 1 state is communicated to priority encoder 114 through conductor 170 and is communicated to the input of delay 116 through conductor 130. Delay 116 is formed to produce a logic 1 signal for a 2 to 4 minute duration upon change of logic state downstream of OR gate 108 from a logic 0 to a logic 1.

On the occurrence of solar heat demand for the pool or solar heat demand for the spa and solar heat availability, a "true" logic state at OR gate 108 immediately triggers a logic 1 signal at delay 116 for 2 to 4 minutes which in turn presents a logic 1 at the input to OR gate 111, even through no water has yet reached solar return flow sensor 67. If the panels or conduits are leaking severely, however, the logic 1 signal from delay 116 will terminate and sensor 67 will not produce a logic 1 signal to gate 111. The flow of water to the solar panels will be shut down by failure of AND gate 109 to see a logic 1 state, which state is communicated through conductors 113 and 123 to OR gate 124.

4. Solar Valve Operation

In order for water to be pumped to solar panels 41, solar valve 39 must be positioned for flow of pool water in conduit 43, instead of conduit 44. Such switching of valve 39 occurs when a logic 1 state exists at solar valve driver 121 from AND gate 119. This state will exist when there is both solar heat demand and solar heat availability and priority encoder 114 indicates proper sequencing of the heat demand and availability with return of water from the solar panels.

Priority encoder 114 will produce a logic 1 or "true" state to conductor 122 and the input to AND gate 119 in advance of the solar valve driver 121 in accordance with the following truth table:

| Input | | Output |
|---|---|---|
| Solar Flow Sensor (conductor 117) | Solar Heat Demand & Avail (conductor 170) | Solar Valve Drive (conductor 122) |
| 0 | 0 | 0 |
| 0 | $1_1$ | 1 |
| $1_1$ | 0 | 1 |
| $1_2$ | $1_1$ | 1 |
| $1_1$ | $1_2$ | 0 |

Subscripts indicate the order of the event's occurance. The logic state at the output of AND gate 109 is communicated to AND gate 119 in advance of drive circuit 121 through conductor 113. Thus, upon the presence of solar heat demand and availability followed by the return of water from the solar panels (or a start-up signal from delay 116), the priority encoder will produce a logic 1 signal to solar drive circuit 121, causing switching of solar valve 39 by means of the valve operator 73 to a position which will produce pumping of the pool water in conduit 43 to the solar panels. As the water passes through the panels, it will be sensed by sensor 67 and maintain the process and valve 39 switched for the pumping of water to the solar panels.

5. Solar Indicator Light

The controller of the present invention can further optionally be provided with a light at the controller indicating that the system is operating in a solar heating mode. Thus, a conductor 128 connected to a solar indicator light actuating means or drive circuit 129 can optionally be provided. This will visually indicate at the controller that the system is operating in the solar mode whenever solar heat demand and solar heat availability are present.

6. Pool/Spa Select Switch

As indicated above, Timing Portion 82 of the logic circuit is not separate and distinct from Temperature Portions 80 and 81, but instead is fully integrated therewith and discussed separately only for the sake of ease of understanding and convenience of illustration. Master switch 151 and pool/spa select switch 138 (FIG. 5) are designed primarily for manual input to the system to enable overriding of temperature switching or time-based programmed switching. Master switch 151 is located at the controller 26, while the pool/spa select switch may be located at controller 26 and further provided with a pool/spa remote select switch 152 (FIG. 1) that can be placed, for example, proximate spa 21.

As will be seen, master switch 151 is connected to the input of AND gate 153, as is pool/spa selected switch 138. Master switch 151 is also coupled by conductor 154 to the Hydromassage Portion 83 of the logic circuit, as will be discussed hereinafter. Once the master switch is "on" (a logic 1 signal), the pool/spa select switch 138, or the remote switch 152, can be used to produce a logic 1 signal at AND gate 153 indicating that the system is in the spa mode. The logic 1 signal is latched into circuit by toggle latch 156. The toggle latch will, in effect, be operated by the pool/spa select switch as long as the master switch 151 is "on". Upon turning off of the master switch toggle latch 156 is reset to a logic 0 pool mode by a latch reset signal through conductor 160.

The function of the pool/spa select switch in overriding programmed and temperature switched functions is to enable gas heating of spa 21. Latching of a logic 1 into the circuit by switch 138 signals "spa mode" to AND gate 139, inverter 140, inverter 145, AND gate 136, and gas heating OR gate 130.

Latching of the pool spa select switch in a logic 1 spa mode, therefore, activates the spa water temperature control gates and the gas heating gate and deactivates the pool temperature control gates. Conversely, if the pool/spa select switch is pressed again or the master switch turned off, the system will be controlled by temperature or time-based switching. This usually results in switching back to pool mode, particularly if pool preference is strapped into the system.

7. Switching of The Pool and Spa Valves

The spa fill/drain/auto selection device 164 (FIG. 5) is coupled to intake valve drive or actuation means 166 and return valve drive or actuation means 167. The valve selection device 164 is a manual or automatic input device that can be employed by the user to not only circulate water to and from the spa or pool, but also to fill or drain the spa. In the normal automatic selection mode, a logic 1 signal at the input to switch apparatus 164, indicating that the "spa mode" has been selected, will cause actuating means 166 to drive the intake valve operator 72 in a manner switching the valve 31 for withdrawal of water from spa 21. Additionally, actuation means 167 will cause the valve operator 74 to switch valve 47 for return of water to the spa through conduit 49. When a logic 0 signal is communicated to the spa fill/drain/auto select device 164, selection device 164 will automatically switch the intake and return valves for circulation of water to and from pool 22.

Since the valve selection device is connected by conductors 163 and 159 to OR gate 157, which in turn is input by the temperature and time switching OR gate 181 and latch 156, time-based or temperature-based or manual switching of the mode from spa to pool or pool to spa will be accompanied by corresponding valve switching.

The filling and draining of spa 21 is accomplished by manually inputting device 164. Such manual input will enable the user to switch valve 31 for withdrawal of water from spa 21 and maintain valve 47 for return of water to pool 22. This will effect draining of the spa, while a reversing of the two valves can be used to fill the spa from the pool.

8. Pool Cleaner Operation

The logic signals indicating the mode of operation of the system also control operation of the pool cleaner. Thus a temperature-based, time-based or manual spa=1 signal from OR gate 157 is communicated through conductors 137 and 159 to inverter 168 (FIG. 4). This logic 1 is inverted to a logic 0 input to AND gate 171. Accordingly, the pool cleaner pump drive actuating means or circuit 172 will be shut down or interrupted while the pool system is in the spa mode. Conversely, however, when the pool system is in the pool mode, the logic 0 input to inverter 168 will be inverted to a logic 1, enabling pool cleaner operation if the other inputs to AND gate 171 are "true" logic inputs. The other inputs to AND gate 171 are described in more detail below in connection with timing functions, but briefly consist of a delay 216, which interrupts pool cleaner operation at the start of solar heating, and input from conductor 213 for timed pool filtration, particularly at night.

9. Programmable Timer

Programmable timer 178 is formed to output logic signals which indicate the heating mode in which the system is operating and the duration of heating. Thus, timer 178 can time switch the system between pool heating and spa heating, and it can be used to program the time of day during which heating will take place.

A 60-Hertz source 188 provides the base for programmable timer 178, and the timer can be set by the user to turn filter pump 28 and pool cleaner pump 61 "on" and "off" at four separate times in every 24-hour period. Programmable timers capable of multiple settings and the production of logic signals during preset time intervals are well known in the industry and will not be described in detail.

Programmable timer 178 produces logic signals to OR gate 181 through conductor 179 to indicate the mode of operation or heating of the pool system. In most instances the timed mode signals are used to start and continue heating of the spa, when the system would otherwise be in a pool mode. A logic 1 is produced by the timer and input to OR gate 181 at time intervals selected by the user so as to control spa operation.

Programmable timer 178 also produces a logic 1 state to the input of AND gate 208, through conductor 209. This input is independent of the programmed spa operation, but as above noted in connection with the pool cleaner description, a spa mode signal will interrupt pool cleaner operation. This is required since return valve 47 is always switched to return water to the spa, and pool cleaner pump 61 does not have any returning pool water to pump when the system is in spa mode.

The other inputs to AND gate 208 required to operate the pool cleaner are a logic 1 signal from pool cleaner flow sensor 69, through conductor 212, and a logic 1 from totalizer 189, indicating that filter pump 28 is operating. Operation of filter pump 28 during the pool mode will force water past pool sweep or cleaner pump 61, even though it is not pumping (as well as return water to the pool through conduit 51). Thus, flow sensor 69 for the pool cleaner will "see" pool water before pump 61 is started and input AND gate 208 with a logic 1.

The input to AND gate 208 from totalizer 189 indicates that the programmable timer 178 has programmed timed operation of the filter pump. The independent input to AND gate 208 directly from timer 178 enables the pool cleaner to be operated for a time interval less than the entire time which the filter pump operates. Conversely, however, the pool cleaner will not be operated unless the filter pump is also operating.

The last function of the programmable timer is to operate the filter pump for filtration. The filter pump will be turned on without regard to the timer for solar heating or gas heating of the spa. In addition, however, the user will want to control the duration and timing of pool filtration. Gas heating of the pool will not occur unless gas enable switch 132 is pushed and a programmed filtration of pool water exists. Thus, pool water filtration also controls when gas heating of the pool can take place.

The 60 Hertz source 188 constantly inputs AND gate 193, but that signal is only permitted to pass to counter 192 when a logic 1 is received from OR gate 194. The OR gate 194 will be input with a logic 1 signal through conductor 118 any time filter pump 28 is operated by a logic 1 input from OR gate 124. Thus, when solar heating in pool mode automatically occurs through temperature switching, a logic 1 switching will be input to OR gate 194. Conductor 118 is connected in advance of OR gate 125, and accordingly, operation of the spa will not produce a logic 1 to the input of OR gate 194. While the spa water is being filtered, the volume of spa water is so small as to make totalizing of the spa water filtration time deceptive, as compared to filtration of the water in pool 22.

Thus, during automatic pool solar heating the 60 Hertz source is passed through AND gate 193 to counter 192, and the counter begins counting the time of filtration of the pool. The user will have preset a total pool filtration time which is required to maintain a clean pool through input device 191. Totalizer compares the preset input with the counter and produces a logic 1 signal from totalizer 189 through conductor 199 to AND gate 208, OR gate 158 and OR gate 201 for all times during which the counter is counting and is less than the preset total filter time.

Totalizer 189 will compare counter 192 against the filter time setting at input 191 only when the totalizer is enabled. The totalizer will be enabled when there is a logic 1 returned through conductor 118 from the filter pump actuation circuit through conductor 251 to OR gate 252, or when there is a logic 1 input to OR gate 252 through conductors 197 and 239 from timer 178. OR gate 252 in turn inputs totalizer 189 through conductor 253 with logic signals, and a logic 1 will enable operation of the totalizer.

Thus, when the filter pump is operated by temperature switching and the system is in pool mode, the totalizer is enabled by input from OR gate 124 through return conductor 118. Similarly, when there is a programmed or timed filter pump operation in pool mode, the totalizer is enabled. When the totalizer is not enabled, a logic 0 or "false" output from the totalizer occurs, even though the counter level is below the preset total filter time.

The other input to OR gate 194 and accordingly AND gate 193 is directly from timer 178 through conductor 197. This permits the user to program operation of the pump for filtration at times other than solar heating of the pool. Pool filtration can advantageously occur at night, since filter pump 28 can then be operated at off-peak hours with attendant cost savings. Normally, pool filtration will require much more time to complete than will operation of the filter pump for pool solar heating. Accordingly, at the end of a day the filter pump may have been operated for 4 hours for solar heating of the pool, but 8 hours can be required for filtration. Timer 178 can be set to produce a logic 1 signal to OR gate 194 through conductor 197 during the off-peak hours of 10:00 p.m. to 6:00 a.m. If pool filtration during heating has occurred for four hours, counter 192 will show a four hour total. Timer 178 will again start filtration at 10:00 p.m. and continue until 2:00 a.m., at which time counter 192 and input 191 will reach the same level. Totalizer 178 will then output a logic 0, shutting down the filter group.

The logic output of the totalizer to OR gate 201 is communicated to AND gate 203, which always received a logic 1 from delay 204, except for 10 minutes when solar heating is terminated. Accordingly, a logic 1 from the totalizer will actuate pump drive 126 while a logic 0 will terminate pump operation.

10. Hydromassage Portion

The hydromassage portion 83 of the logic circuit of the controller of the present invention includes a jet control switch 221 coupled to AND gate 222 and a blower control switch 223 coupled to AND gate 224. Both AND gates in turn are connected by conductor 154 to master switch 151, so that when the master switch is "on", the AND gates will receive a logic 1 signal from the master switch and the jet and blow control switches can be pushed to input logic 1 signals to the AND gates and toggles 226 and 227. The toggle latches are coupled to input jet pump actuating means or drive circuit 228 and blower actuating means or drive circuit 229. Thus, the drive circuit 228 actuates power relay 71 to drive jet pump 54 and further actuates a power relay 71 for air blower 30.

Both the jet control and blower control switches are preferably remote switches, for example, at switch 152, that can be positioned proximate the spa for control of operating conditions at the spa. Neither of these switches, however, can be used to actuate the hydromassage equipment unless the master switch is "on". It is possible, therefore, to provide the master switch at controller 26 in a secure location so that the hydromassage until will only be used while supervised by the pool owner. Thus, children cannot operate the hydromassage equipment unless the master switch is also "on". Toggle reset is accomplished by inputting toggle latch 226 and 227 through conductor 235 from master switch 151 when the master switch is turned "off".

11. Additional Features a. Freeze Protection

It is essential that pool water in solar panels 41 not be allowed to freeze in the panels or plumbing. Freeze protection is provided in the logic circuit of the present invention and includes two strapping options which allow the system to be tailored to the user's needs.

First, freeze protection comparator 141 (FIG. 3) can be strapped from terminal 241 to one of terminals 242 and 243. When strapped to terminal 242, the comparator compares a preset input, such as 33° F., in input device 142 with solar temperature sensor 66. This causes the comparator to produce a logic 1 output when the ambient temperature sensed proximate the solar panels is approaching freezing.

If the circuit is strapped from terminal 141 to 243, the preset temperature is compared against the temperature measured by pool sensor 68. This comparison will cause the output of a logic 1 signal when water in the plumbing is approaching freezing.

The second strapping option relating to freeze protection occurs at terminals 143, 144 and 146 (FIG. 4). If one of the temperature sensors drops below the freeze protection input, a "true" or logic 1 signal will be generated from comparator 141 to terminal 143. The terminal 143 can be selectively strapped to either a drain terminal 144 or a recirculation terminal 146.

The decision as to strapping between terminal 143 and the drain and recirculation terminals will depend upon the configuration and suitability of each approach to the specific pool system which is being controlled. In some instances drainage of the solar panels is not a practical option. If drainage can be accomplished, a strap between terminals 143 and 144 will cause a logic signal from comparator 141 to be present at actuating means or a drain valve drain circuit 147 so as to open drain valve 76. Thus, the drain valve operator 77 of FIG. 1 will be actuated by drive circuit 147, and valve 76 will be opened to drain solar panels 41 and avoid freezing in the panels.

If freeze protection is to be accomplished by recirculation, a strap between terminals 143 and 146 will be employed, and a logic 1 signal from comparator 141 will be communicated to OR gates 108 and 124, to switch the solar valve for flow of water in conduit 43 and to turn on filter pump 28. Water sill then be circulated in the solar panels to avoid freezing and destruction of the panels.

b. Solar Panel Superheating Protection

Another important feature of the present invention is that the logic circuit is formed to cause drain-down of the solar panels upon termination of all solar heating. Solar panel drain-down prevents superheating of stagnant water in the panels, which superheating causes panel scaling and deterioration.

Draining of solar panels 41 is accomplished by providing delay means 204 that is coupled to the output of OR gate 104 (FIG. 4). OR gate 104 is input by both comparator 95 and comparator 96. Comparator 95 will produce a logic 1 signal until the pool water is heated above the pool temperature for solar heating, while comparator 96 will similarly produce a logic 1 signal until the preset spa temperature is reached.

Delay 204 is formed to input a logic 1 signal to AND gate 203 for all conditions of operation except when the input to the delay changes from 1 to 0. Accordingly, upon the last to occur of pool or spa solar heating both comparators 95 and 96 will input gate 104 with a logic 0 and delay will change from a logic 1 to input AND gate 203 with a logic 0 for 10 minutes.

When the solar heat demand for both the spa and pool terminates, the logic 1 input from AND gate 109 to OR gate 124 also terminates. Thus, AND gate 203 will no longer input OR gate 124, nor will AND gate 109, and the filter pump drive circuit will shut down filter pump operation.

Upon shut down of pump operation water will drain back out of panels 41 through conduit 43, check valve 45 and conduit 50. The water will then gravitate back through pump 28 to the pool or spa. This avoids stagnation and superheating of the pool water in the solar panels.

Air Purge From Solar Panels

When solar heating is commenced, the solar panels will have air in them. As water is pumped to panels 41, the air is driven out conduit 46 toward the pool or spa. If the system is in the pool mode, the pool cleaner is shut down or interrupted to permit purging of the air. The logic state at AND gate 109 is communicated through conductors 113 and 214 to delay means 216 (FIG. 3) and AND gate 171. As the logic state changes from 0 (no solar demand) to 1 (solar demand) delay 216 produces a "false" or 0 signal which interrupts the operation of the pool cleaner for a ten-minute period. This interruption of the operation of the pool cleaner enables air in the solar panels to be purged from the system through the pool sweep pump. Except in the solar start-up condition, a logic 1 state is produced by delay 216 at AND gate 171, and operation of the pool cleaner pump is dependent upon the logic state of the input at conductors 169 and 213 to AND gate 171.

d. Isolation of Switching from Power Circuits

Another important feature of the controller of the present invention is that the timing and switching functions of the controller means are not directly interposed in the power circuits. Thus, the driver circuits for the various pool water-conditioning apparatus are in a separate lower-voltage (for example, 24 volt) control circuit that interfaces with the high-voltage power required to switch valves and pump water. As will be seen, the pumps are provided with a high-voltage 220-volt source 230, while each of the valve operators is provided with its own 115-volt sources 231. Drive circuits or actuating means 121, 126, 129, 134, 147, 166, 167 and 172 are all in the low voltage logic circuit and interface the logic circuit with the power circuits.

e. Gas Heater Protection

When gas heating occurs there is a potential for damage of the plumbing and heater upon termination of heating. Most of the plumbing in pool systems today will be provided by plastic pipes. If filter pump operation terminated upon termination of the operation of the gas heater, the water in the heater and adjacent pipes would continue for some period of time to be heated by heater overrun. Accordingly, continued operation of the filter after termination of the gas heater will dissipate heat build-up in the heater and adjacent plumbing.

Gas heating will occur automatically only when spa heating occurs or manually when pool heating during timed filtration and the gas enable is pushed. Accordingly, OR gate 158 (FIG. 5) will change from a logic 1 to a logic 0 and trigger delay 207 only when the system changes from spa to pool mode, as input from OR gate 157, or when totalizer 189 terminates filtration (either programmed heating or filtration). When spa heating terminates or programmed filtration with pool gas enable terminates, delay 207 will output a logic 1 for 10 minutes which will keep the filter pump on until heat in the gas heater is dissipated.

What is claimed is:

1. Controller means for a pool system, said pool system including a pool; pool related conditioning apparatus including pump means and actuating means coupled to drive said pump means; solar water heating apparatus and non-solar water heating apparatus; and hydraulic circuit means including valve means formed for the flow of pool water to and from said pool, said pump means and said solar water heating and said non-solar water heating apparatus; said controller means including a plurality of sensing apparatus formed and positioned to sense conditions in said pool system and formed to produce a signal in response to said conditions, actuating means formed and coupled to said solar sater heating and said non-solar water heating apparatus for actuation of the same, and programmable input means formed for receipt and storage of input and formed to produce a signal based upon said input, and said controller means further being formed with logic circuit means having logic gates and coupled to said sensing apparatus, said actuating means and said programmable input means for control of the operating parameters of said pool system, wherein the improvement in said controller means comprises:

said sensing apparatus includes:
  (i) water temperature sensing means formed and positioned to sense pool water temperature, and
  (ii) solar temperature sensing means formed and positioned to sense a radiant temperature proximate said solar water heating apparatus; and said logic circuit includes comparator means and temperature level setting means connected to said comparator means, said comparator means being formed to compare said pool water temperature sensed by said water temperature sensing means with said radiant temperature and with at least one preset temperature from said temperature level setting means and to input said logic circuit with logic true and logic false signals for controlled actuation of said solar water heating apparatus and said non-solar water heating apparatus and said non-solar water heating apparatus in accordance with a predetermined logic sequence.

2. The controller means as defined in claim 1 wherein, said logic gates are formed and connected to present logic signals to actuating means for said pump means and said valve means to produce:
  (i) flow of pool water to said solar water heating apparatus when said pool water temperature is below both said radiant temperature and said preset temperature, and
  (ii) flow of pool water to said non-solar water heating apparatus when said pool water temperature is below said preset temperature and above said radiant temperature.

3. The controller means as defined in claim 1 wherein, said temperature level setting means includes first means formed for presetting of a first temperature corresponding to a desired pool water temperature when solar heat is available, and second means formed for presetting of a second temperature corresponding to a desired pool water temperature when solar heat is not available;
said comparator means is formed to compare said pool water temperature and said radiant temperature and to produce a logic true signal indicating solar heat is available when said radiant temperature is greater than said pool water temperature and a logic false signal when it is below;

said comparator means is further formed to compare said pool water temperature with both said first temperature and said second temperature and to produce a logic true signal indicating heat demand when said pool water temperature is below either said first temperature or said second temperature and a logic false signal when it is below; and said logic gates are formed and connected to present logic true and false signals at said actuating means for said pump means and said valve means and said non-solar heating apparatus depending upon the combination of heat demand and solar heat available logic signals.

4. The controller means as defined in claim 3 wherein, said pool system includes a swimming pool and a spa;

said programmable input means includes means for producing a spa mode logic signal and a pool mode logic signal, said hydraulic circuit means and said valve means are formed for selective flow of pool water to and from: said swimming pool, said spa, said solar water heating apparatus, and said non-solar water heating apparatus;

said temperature level setting means includes third means formed for presetting of a third temperature corresponding to a desired pool water temperature in said spa when said spa is to be used;

said sensing apparatus further includes water temperature sensing means formed and positioned to sense the temperature of pool water in said spa;

said comparator means is formed to compare said pool water temperature in said spa with said third temperature and to produce a logic true signal indicating spa heat demand when said pool water temperature in said spa is below said third temperature and a logic false signal when it is above;

said comparator means is further formed to compare said radiant temperature with said pool water temperature in said spa and to produce a logic true signal indicating solar heat availability when said radiant temperature is above said pool water temperature in said spa and a logic false signal when it is below; and said logic gates are formed to present logic signals to actuating means for said valve means and said pump means to provide flow of pool water to a selected one of said pool and said spa and a selected one of said solar and said non-solar heating apparatus.

5. The controller means as defined in claim 4 wherein, said comparator means is provided by five comparators, namely:
 a. a pool solar comparator connected to compare pool temperature in said pool with radiant temperature;
 b. a spa solar comparator connected to compare pool water temperature in said spa with radiant temperature;
 c. a pool solar heat demand comparator connected to compare pool water temperature in said pool with said first temperature;
 d. a pool non-solar heat demand comparator connected to compare pool water temperature in said pool with said second temperature; and
 e. a spa heat demand comparator connected to compare pool water temperature in said spa with said third temperature.

6. The controller means as defined in claim 1 wherein, said solar water heating apparatus includes a drain valve formed and positioned for draining of pool water therefrom, said programmable input means includes temperature level setting means formed for presetting a freeze protect temperature proximate and above the temperature at which pool water will freeze;

freeze protect comparator means coupled to said logic circuit and to said temperature sensing means and said temperature level setting means, said freeze protect comparator means being formed to compare at least one temperature sensed by said temperature sensing means with said preset freeze protect temperature and formed to input said logic circuit with a logic true signal when a temperature sensed is below said preset temperature and a logic false signal when all sensed temperatures are above said preset temperature; and said logic circuit is formed upon receipt of a logic true input from said comparator to cause said actuating means to actuate at least one of:
 (i) said pump means to cause circulation of pool water in said hydraulic circuit means, and
 (ii) said drain valve to cause draining of said solar water heating apparatus.

7. The controller means as defined in claim 6, and selection means interposed between said freeze protect comparator means and said logic circuit and formed for selected input of logic signals to different portions of said logic circuit to cause a selected one of draining of said solar water heating apparatus and circulation of pool water in said hydraulic circuit means to occur.

8. The controller means as defined in claim 6 wherein, said sensing apparatus includes temperature sensing means formed and positioned to sense both said ambient temperature and said pool water temperature; and selection means interposed between said sensing means and said freeze protect comparator means and formed for input of said freeze protect comparator means with a selected one of said ambient temperature and said pool water temperature.

9. The controller means as defined in claim 8, and selection means interposed between said freeze protect comparator means and said logic circuit and formed for selected input of logic signals to different portions of said logic circuit to cause a selected one of draining of said solar water heating apparatus and circulation of pool water in said hydraulic circuit means to occur.

10. The controller means as defined in claim 1 wherein, said sensing apparatus includes pool water presence sensing apparatus positioned in said hydraulic circuit means at a location enabling sensing of the return of pool water from said solar water heating apparatus to said pool and formed to produce a logic true signal when water is returning from said solar water heating apparatus and a logic false signal where no significant amount of water is returning; and said logic circuit is coupled to said pool water presence sensing apparatus and is coupled to actuating means for said valve means, said logic circuit further being formed to cause actuation of said actuating means in a manner terminating flow of pool water to said solar water heating apparatus upon receipt of a logic false signal from said pool water presence sensing apparatus.

11. The controller means as defined in claim 10 wherein,
said logic circuit further includes a timed start-up circuit means interposed between said pool water presence sensing apparatus and said actuation means for said valve means, said timed start-up circuit means being formed to produce a logic true signal to said logic circuit for a predetermined period of time during after actuation of said valve means for flow of pool water to said solar water heating apparatus.

12. The controller means as defined in claim 11 wherein,
said timed start-up circuit means is provided by delay means and a priority encoder means.

13. The controller means as defined in claim 1 wherein,
said pool system further includes a spa; and
said logic circuit includes preference selection means formed to enable input of logic signals to said logic circuit as to preferential heating of pool water in a selected one of said pool and said spa, said logic circuit being further formed and coupled to said water temperature sensing means and said solar temperature sensing means for heating of pool watering one of said pool and said spa depending upon the availability of solar heat and the preference logic signal from said preference selection means.

14. The controller means as defined in claim 13, wherein,
said logic circuit is formed for actuation of said solar water heating apparatus in preference to said non-solar water heating apparatus and automatic actuation of said non-solar water heating apparatus when solar heat is not available.

15. The controller means as defined in claim 14 wherein,
said programmable input means includes non-solar water heating override means formed to selectively enable said non-solar water heating apparatus to be actuated and operated in addition to said solar water heating apparatus.

16. The controller means as defined in claim 15 wherein,
said non-solar water heating override means includes independently operable pool override means for heating of said pool and independently operable spa override means for heating of said spa.

17. The controller means as defined in claim 1, wherein,
said logic circuit is formed to cause actuation of said solar water heating apparatus in preference to said non-solar water heating apparatus and automatic actuation of said non-solar water heating apparatus when solar heat is not available.

18. The controller means as defined in claim 1 wherein,
said logic signals from said sensing apparatus cause temperature based switching of said valve means; and
said logic signals from said programmable input means cause time based switching of said valve means.

19. The controller means as defined in claim 18 wherein,
said programmable input means includes a programmable timer formed to produce time based logic signals and connected to said portion of said logic circuit; and
said sensing apparatus and said programmable timer are coupled to said portion of said logic circuit through an OR gate means for switching of said valve means.

20. The controller means as defined in claim 1 wherein,
said conditioning apparatus includes a pool cleaner;
said hydraulic circuit is coupled to said pool cleaner;
said sensing apparatus includes water presence sensing apparatus positioned in said hydraulic circuit downstream of said pool cleaner; and
said logic circuit is formed to enable pool cleaner operation when said water presence sensing apparatus senses the presence of pool water.

21. The controller means as defined in claim 20 wherein,
said pool system includes a pool and a spa;
said valve means is formed for selected flow of pumped pool water to said pool and said spa;
said pool cleaner is mounted in said pool; and
said logic circuit is formed to interrupt pool cleaner operation when said valve means is directing pool water to said spa.

22. The controller means as defined in claim 20 wherein,
said logic circuit includes delay means formed to interrupt pool cleaner operation for a predetermined delay time upon start-up of solar water heating.

23. The controller means as defined in claim 1 wherein,
said pool system includes a pool and a spa;
said pool related conditioning apparatus further includes:
(i) a filter pump and filter,
(ii) a pool cleaner pump and pool cleaner mounted in said pool, and
(iii) hydromassage means mounted in said spa;
said hydraulic circuit means includes:
(i) conduit means coupled to said filter pump and to said pool and said spa for the withdrawal of pool water therefrom,
(ii) intake valve means mounted in said conduit means intermediate said filter pump and said pool and said spa and formed for selective withdrawal of pool water from said pool and said spa,
(iii) conduit means coupled to said filter pump and said filter for the flow of pool water to said filter,
(iv) conduit means coupled to said filter and said solar water heating apparatus and said non-solar water heating apparatus,
(v) solar valve means mounted in said conduit means intermediate said filter and said solar and non-solar water heating apparatus and formed for selective flow of pool water to said solar and said non-solar water heating apparatus,
(vi) conduit means connected to a downstream side of said solar water heating apparatus and an upstream side of said non-solar water heating apparatus, (vii) conduit means connected to a downstream side of said non-solar water heating apparatus and connected to said pool and said spa for return of pool water thereto, (viii) return valve means mounted in said conduit means intermediate said non-solar water heating apparatus and said pool and said spa and formed for selective flow of pool water to said pool and said spa, and (ix) said pool cleaner pump being coupled to said conduit means between said return valve means and said pool;

said sensing apparatus including:
 (i) pool water temperture sensing apparatus positioned in said conduit means intermediate said pool and said intake valve means,
 (ii) pool water temperature sensing apparatus positioned to sense the temperature of the pool water in said spa,
 (iii) radiant heat sensing apparatus positioned proximate said solar water heating apparatus,
 (iv) water presence sensing apparatus positioned in said conduit means intermediate said solar and said non-solar water heating apparatus, and
 (v) water presence sensing apparatus positioned in said conduit means intermediate said pool cleaner pump and said pool;

said actuating means includes:
 (i) an intake valve driver circuit and intake valve operator,
 (ii) a filter pump driver circuit,
 (iii) a solar valve driver circuit and solar solar valve operator,
 (iv) a non-solar water heating apparatus drive circuit,
 (v) a return valve drive circuit and return valve drive operator,
 (vi) a pool cleaner pump drive circuit, and
 (vii) a hydromassage means drive circuit; and said programmable input means includes:
 (i) temperature setting means for inputting a desired pool water temperature:
  (a) in said pool with solar heating,
  (b) in said pool with non-solar heating,
  (c) in said spa, and
  (d) in one of said conduit means and said solar water heating apparatus proximate and above the freezing temperature of said pool water,
 (ii) programmable timer means formed for timed operation of said filter pump and said pool cleaner pump and formed for timed operation of said intake valve and said return valve; and
 (iii) filtration time setting means.

24. A method for controlling the operation of pool related conditioning apparatus in a pool system, said pool system includes a pool, pool related conditioning apparatus including solar heating apparatus and non-solar heating apparatus, a hydraulic circuit coupling at least a portion of said conditioning apparatus to said pool, sensing apparatus mounted in said pool system and formed to sense pool water temperature and radiant temperature proximate said solar water heating apparatus, and controller means including temperature level setting means and comparator means coupled to said sensing apparatus and said conditioning apparatus and formed to actuate said conditioning apparatus in response to said sensing apparatus, said method comprising the steps of:

sensing the temperature of pool water and the radiant temperature proximate said solar water heating apparatus;

comparing the sensed temperatures to at least one preset temperature; and actuating one of said solar heating apparatus and said non-solar heating apparatus in accordance with a predetermined logic sequence.

25. Controller means for a pool system, said pool system including a pool and a spa; pool related conditioning apparatus including heating apparatus; and hydraulic circuit means for the flow of pool water to and from said pool, spa and said conditioning apparatus; said controller means including a plurality of sensing apparatus formed and positioned to sense conditions in said pool system and formed to produce a signal in response to said conditions, actuating means formed and coupled to said conditioning apparatus for actuation of same, and programmable input means formed for receipt and storage of input and formed to produce signal based upon said input, and said controller means further being formed with circuit means coupled to said sensing apparatus, said actuating means and said programmable input means for control of the operating parameters of said pool system, wherein the improvement in said controller means comprises:

said circuit means is provided as a logic circuit formed with a plurality of logic gates formed to input logic true and logic false signals from said sensing apparatus and from said programmable input means to said actuating means only in accordance with a predetermined logic sequence, said logic circuit being formed to feed back a logic signal indicating the mode or pool system operation to a heating portion of said logic circuit, said heating portion of said logic circuit being formed with a first set of logic gates which are activated when a logic true signal is fed back to said heating portion and a second set of logic gates which are activated when a logic false signal is fed back to said heating portion, said first set of logic gates controlling heating of one of said pool and said spa and said second set of logic gates controlling heating of a remainder of said pool and said spa.

26. Controller means for a pool system, said pool system including a pool; a pool water filter; pump means; and hydraulic circuit means including valve means for the flow of pool water to and from said pool, spa and said filter; said controller means including a plurality of sensing apparatus formed and positioned to sense conditions in said pool system and formed to produce a signal in response to said conditions, actuating means formed and coupled to said pump means and said valve means for actuation of same, and programmable input means formed for receipt and storage of time sequene input and formed to produce a timing signal based upon said input, and said controller means further being formed with circuit means coupled to said sensing apparatus, said actuating means and said programmable input means for control of operation of said pump means and said valve means, wherein the improvement in said controller means comprises:

said programmable input means further includes a totalizer, a time setting input means connected to said totalizer, and a counter connected to said totalizer, said totalizer being further connected to said programmable timer and formed when enabled by a logic true signal from said programmable timer to output a logic true signal whenever the value in said counter is less than the value in said time setting input means, said totalizer being coupled to said logic circuit to cause actuation of said pump means upon output of a logic true signal;

said logic circuit being further formed to input said counter and increase the value therein during actuation of said pump means in response to said sensing apparatus;

said programmable timer being connected to said counter to input said counter and increase the value therein during programmed time intervals, and said programmable timer being formed and connected to said counter and said counter being formed to periodically reset said counter to a beginning value upon receipt of a signal from said programmable timer.

27. The controller means as defined in claim 26 and, a source formed to generate a timing signal at a constant rate and coupled to said logic circuit in advance of said counter, said input to said counter from said logic circuit and said programmable timer both being connected through logic gates to permit passage of said timing signal to said counter upon receipt of a logic true signal from either of said logic circuit and said programmable timer.

28. The controller means as defined in claim 26 wherein, said pool system further includes a spa;

said logic circuit is formed to input said counter with a logic true signal upon actuation of said pump means when filtering pool water coming from said pool and to input said counter with a logic false signal upon actuation of said pump means when filtering pool water coming from said spa.

29. A method for controlling the operation of pool related conditioning apparatus in a pool system, said pool system including a pool, pool related conditioning apparatus including a filter pump and a pool water filter, a hydraulic circuit coupling said pool to said filter pump and said filter sensing apparatus mounted in said pool system and formed to sense temperature and the presence of pool water, and controller means formed for input of preset timed intervals for timed operation of said filter pump and formed for input of a preset total time of filter pump operation and coupled to said sensing apparatus and said filter pump and formed to actuate said filter pump in response to said sensing apparatus, said method comprising the steps of:

operating said filter pump in response to temperatures sensed by said sensing apparatus;

operating said filter pump in accordance with said input preset timed intervals;

comparing the total of:
(i) the time of filter pump operation in response to temperatures sensed, and
(ii) the time of filter pump operation in accordance with said input preset timed intervals, with the input for total time of filter pump operation; and terminating filter pump operation by said controller means when said total time of temperature sensed and interval input operation equals said input of a preset total time of filter pump operation.

* * * * *

UNITED STATES PATENT AND TRADEMARK OFFICE
CERTIFICATE OF CORRECTION

PATENT NO. : 4,322,297
DATED : March 30, 1982
INVENTOR(S) : Peter Bajka

It is certified that error appears in the above-identified patent and that said Letters Patent are hereby corrected as shown below:

Col. 1, line 14, delete "tubes" and insert ---tubs---;

Col. 4, line 26, delete "tube" and insert ---tub---;

Col. 9, line 46, delete "signal" and insert ---single---;

Col. 10, line 63, delete "tne" and insert ---the---;

Col. 20, line 33, delete "switching" in second occurrence, and insert ---signal---;

Col. 22, line 29, after "logic" insert the number ---1---; and

Col. 23, line 12, insert ---c.--- before "Air".

Signed and Sealed this

Twentieth Day of July 1982

[SEAL]

Attest:

GERALD J. MOSSINGHOFF

Attesting Officer    Commissioner of Patents and Trademarks